US012626861B2

(12) United States Patent
Takabayashi et al.

(10) Patent No.: US 12,626,861 B2
(45) Date of Patent: May 12, 2026

(54) CAPACITOR UNIT AND ELECTRONIC DEVICE

(71) Applicant: Mitsubishi Electric Corporation, Tokyo (JP)

(72) Inventors: Hirokazu Takabayashi, Tokyo (JP); Takahiro Masuyama, Tokyo (JP); Yuji Shirakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 242 days.

(21) Appl. No.: 18/549,932

(22) PCT Filed: May 10, 2021

(86) PCT No.: PCT/JP2021/017729
    § 371 (c)(1),
    (2) Date: Sep. 11, 2023

(87) PCT Pub. No.: WO2022/239069
    PCT Pub. Date: Nov. 17, 2022

(65) Prior Publication Data
    US 2024/0222008 A1     Jul. 4, 2024

(51) Int. Cl.
    *H01G 2/08*     (2006.01)
    *H01G 4/38*     (2006.01)
    *H01G 4/40*     (2006.01)
    *H01G 4/32*     (2006.01)
(52) U.S. Cl.
    CPC ................. *H01G 2/08* (2013.01); *H01G 4/38* (2013.01); *H01G 4/40* (2013.01); *H01G 4/32* (2013.01)

(58) Field of Classification Search
    None
    See application file for complete search history.

(56) References Cited

U.S. PATENT DOCUMENTS

| | | | |
|---|---|---|---|
| 4,670,814 A | 6/1987 | Matsui et al. | |
| 7,864,506 B2 | 1/2011 | Pal et al. | |
| 9,615,490 B2 | 4/2017 | Topolewski et al. | |
| 10,477,733 B1 | 11/2019 | Skalski | |
| 2009/0141419 A1* | 6/2009 | Pal .......................... | H01G 11/82 29/25.42 |
| 2011/0102966 A1 | 5/2011 | Takeoka et al. | |

(Continued)

FOREIGN PATENT DOCUMENTS

| | | | | |
|---|---|---|---|---|
| CN | 107318271 A | * | 11/2017 | ......... H05K 7/20909 |
| CN | 108806992 A | * | 11/2018 | ............. H01G 11/76 |

(Continued)

OTHER PUBLICATIONS

DE '578 machine translation (Year: 2018).*

(Continued)

*Primary Examiner* — Dion R. Ferguson

(74) *Attorney, Agent, or Firm* — BUCHANAN, INGERSOLL & ROONEY PC

(57) ABSTRACT

A capacitor unit includes a plurality of capacitor elements and one or more heat transfer members located adjacent to at least one capacitor element of the plurality of capacitor elements. The one or more heat transfer members internally dissipate heat received from at least one capacitor element of the plurality of capacitor elements.

2 Claims, 10 Drawing Sheets

(56) References Cited

U.S. PATENT DOCUMENTS

| | | | |
|---|---|---|---|
| 2014/0294045 A1 * | 10/2014 | Hironaka | H01G 9/008 |
| | | | 374/142 |
| 2014/0345492 A1 | 11/2014 | Fujito et al. | |
| 2018/0019062 A1 | 1/2018 | Okuzuka et al. | |
| 2018/0233285 A1 * | 8/2018 | Sato | H01G 4/18 |
| 2019/0166729 A1 | 5/2019 | Kitanaka et al. | |
| 2019/0333702 A1 * | 10/2019 | Song | H01G 11/76 |
| 2020/0118753 A1 * | 4/2020 | Nishimura | H01G 4/33 |
| 2024/0206125 A1 | 6/2024 | Eckstein et al. | |
| 2024/0222008 A1 * | 7/2024 | Takabayashi | H01G 4/38 |

FOREIGN PATENT DOCUMENTS

| | | | | |
|---|---|---|---|---|
| DE | 102018127576 A1 * | 5/2019 | | H01G 2/08 |
| DE | 102019116179 A1 * | 12/2019 | | H05K 7/2089 |
| DE | 102020104549 A1 * | 8/2020 | | H01G 4/33 |
| DE | 102021110585 A1 | 10/2022 | | |
| JP | S5837125 U | 3/1983 | | |
| JP | S62076513 A | 4/1987 | | |
| JP | H11220869 A * | 8/1999 | | H02M 1/06 |
| JP | 2006012948 A | 1/2006 | | |
| JP | 2006253544 A | 9/2006 | | |
| JP | 2013163503 A | 8/2013 | | |
| JP | 2014187150 A * | 10/2014 | | H01G 4/224 |
| JP | 5906376 B2 * | 4/2016 | | |
| JP | 2020064917 A | 4/2020 | | |
| KR | 20150092693 A * | 8/2015 | | H01G 2/106 |
| WO | WO-2010004704 A1 * | 1/2010 | | H01G 2/08 |
| WO | WO-2015182081 A1 * | 12/2015 | | H01G 4/224 |
| WO | 2016117441 A1 | 7/2016 | | |
| WO | WO-2017204065 A1 * | 11/2017 | | H01G 2/14 |
| WO | 2018020615 A1 | 2/2018 | | |
| WO | WO-2022163278 A1 * | 8/2022 | | H01G 4/32 |
| WO | WO-2022190708 A1 * | 9/2022 | | H01G 2/02 |
| WO | WO-2022239069 A1 * | 11/2022 | | H01G 4/40 |

OTHER PUBLICATIONS

Notice of Reasons for Refusal dated Jan. 9, 2024, issued in the corresponding Japanese Patent Application No. 2023-520588, 6 pages including 3 pages of English Translation.

International Search Report (PCT/ISA/210) with translation and Written Opinion (PCT/ISA/237) mailed on Jul. 20, 2021, by the Japanese Patent Office as the International Searching Authority for International Application No. PCT/JP2021/017729. (10 pages).

Notice of Reasons for Refusal with translation dated Aug. 8, 2023 issued by the Japanese Patent Office in corresponding Japanese Patent Application No. 2023-520588. (8 pages).

Office Action dated Nov. 14, 2025, issued in the corresponding German Patent Application No. 112021007634.5, 8 pages including 4 pages of English Translation.

Office Action dated Dec. 31, 2025, issued in the corresponding Indian Patent Application No. 202327060436. (8 pages).

* cited by examiner

CAPACITOR UNIT AND ELECTRONIC DEVICE

TECHNICAL FIELD

The present disclosure relates to a capacitor unit and an electronic device.

BACKGROUND ART

Electronic devices such as power conversion apparatuses that convert input power and supply the power resulting from the conversion to a load may include a capacitor unit with a large capacitance. Patent Literature 1 describes an example of such an electronic device. A vehicle drive controller described in Patent Literature 1 includes a capacitor unit for smoothing power installed in the center of a housing.

CITATION LIST

Patent Literature

Patent Literature 1: Unexamined Japanese Patent Application Publication No. 2013-163503

SUMMARY OF INVENTION

Technical Problem

Heat generated in the capacitor unit during energization is dissipated to air inside the housing of the electronic device. The housing for the electronic device accommodates heating elements such as switching elements, in addition to the capacitor unit, which may increase the temperature of the air inside the housing. The capacitor unit with a large capacitance generates a large amount of heat, and thus may not be cooled sufficiently due to the rising temperature in the housing. This may increase the internal temperature of the capacitor unit, or more specifically, the temperature of capacitor elements in the capacitor unit.

For a capacitor element being a film capacitor, the film for the capacitor element is to have an allowable temperature higher than the maximum temperature reachable by the capacitor element. The temperature of the capacitor element rises as a larger amount of current flows through the capacitor element. This may limit the amount of current flowing through the capacitor elements when the allowable temperature of the film is not sufficiently high. In other words, the capacitor unit may have design limitations, including the allowable temperature of the film in the capacitor elements and the current flowing through the capacitor elements, due to a temperature increase in the capacitor elements accommodated in the housing. This is not limited to power supply devices including a capacitor unit with a large capacitance, but may occur to any electronic devices including a capacitor unit that may fail to cool the capacitor unit sufficiently.

In response to the above circumstances, an objective of the present disclosure is to provide a capacitor unit and an electronic device including the capacitor unit with a smaller temperature increase in capacitor elements.

Solution to Problem

To achieve the above objective, a capacitor unit according to an aspect of the present disclosure includes a plurality of capacitor elements and one or more heat transfer members.

The one or more heat transfer members are located adjacent to at least one capacitor element of the plurality of capacitor elements. The one or more heat transfer members internally dissipate heat received from at least one capacitor element of the plurality of capacitor elements.

Advantageous Effects of Invention

The capacitor unit according to the above aspect of the present disclosure allows heat generated in the plurality of capacitor elements to be dispersed inside the heat transfer members. The capacitor elements are thus cooled, which results in a smaller temperature increase.

BRIEF DESCRIPTION OF DRAWINGS

FIG. 4 is a diagram of a capacitor element in the embodiment;

DESCRIPTION OF EMBODIMENTS

A capacitor unit and an electronic device according to one or more embodiments of the present disclosure are described below in detail with reference to the drawings. In the figures, the same reference signs denote the same or equivalent components.

Examples of the electronic device include a power conversion apparatus mounted on a railway vehicle that converts direct current (DC) power supplied from a DC power source to three-phase alternating current (AC) power and supplies the AC power to an electric motor. An electronic device 1 according to Embodiment 1 is described below using the power conversion apparatus as an example.

Figure 1:
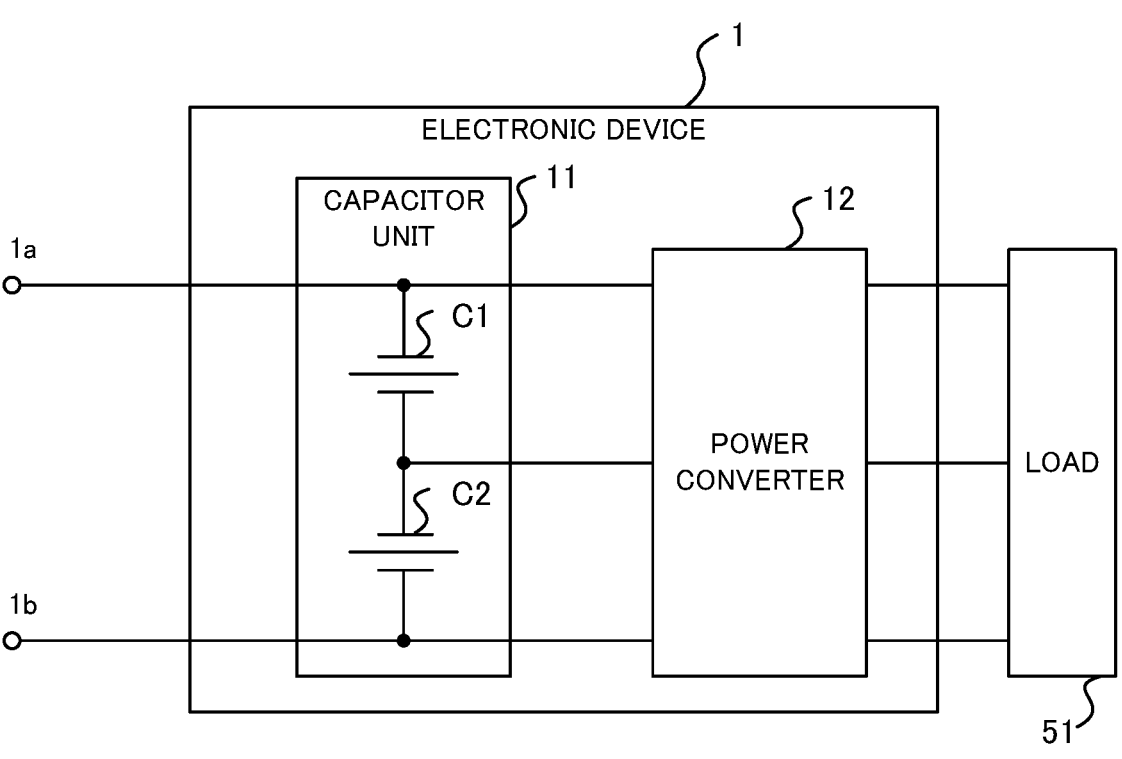
FIG. 1 is a block diagram of an electronic device according to an embodiment.

The electronic device 1 illustrated in FIG. 1 receives DC power from an unillustrated power source, or more specifically, from a current collector that acquires power supplied from a substation through a power supply line. The power supply line is, for example, an overhead line or a third rail. The current collector is, for example, a pantograph or a collector shoe. The electronic device 1 converts the DC power supplied from the current collector to three-phase AC power and supplies the three-phase AC power resulting from the conversion to a load 51. In the embodiment, the electronic device 1 is a three-level inverter, and the load 51 is a three-phase induction motor.

The electronic device 1 includes a positive terminal 1a that is connected to the current collector, a negative terminal 1b that is grounded, a capacitor unit 11 that is charged with power supplied from the current collector, and a power converter 12 that converts DC power supplied from the current collector through the capacitor unit 11 to three-phase AC power. Preferably, the positive terminal 1a is electrically connected to the current collector with, for example, a contactor or a filter reactor. The capacitor unit 11 includes a first capacitor C1 and a second capacitor C2. The first capacitor C1 and the second capacitor C2 are connected in series to each other.

The power converter 12 includes a pair of primary terminals electrically connected to the positive terminal 1a and the negative terminal 1b. A terminal between the pair of primary terminals is connected to a connection point between the first capacitor C1 and the second capacitor C2 that are connected in series to each other. The power converter 12 includes three secondary terminals corresponding to phases U, V, and W of the three-phase AC power and connected to the corresponding input terminals of the load 51. The power converter 12 includes multiple switching elements controlled by an unillustrated controller. The switching elements are, for example, insulated-gate bipolar transistors (IGBTs). The power converter 12 converts power through a switching operation controlled by the controller that switches the switching elements between on and off More specifically, the power converter 12 converts the DC power supplied through the primary terminals to three-phase AC power to be supplied to the load 51 and outputs the three-phase AC power through the secondary terminals.

Figure 2:
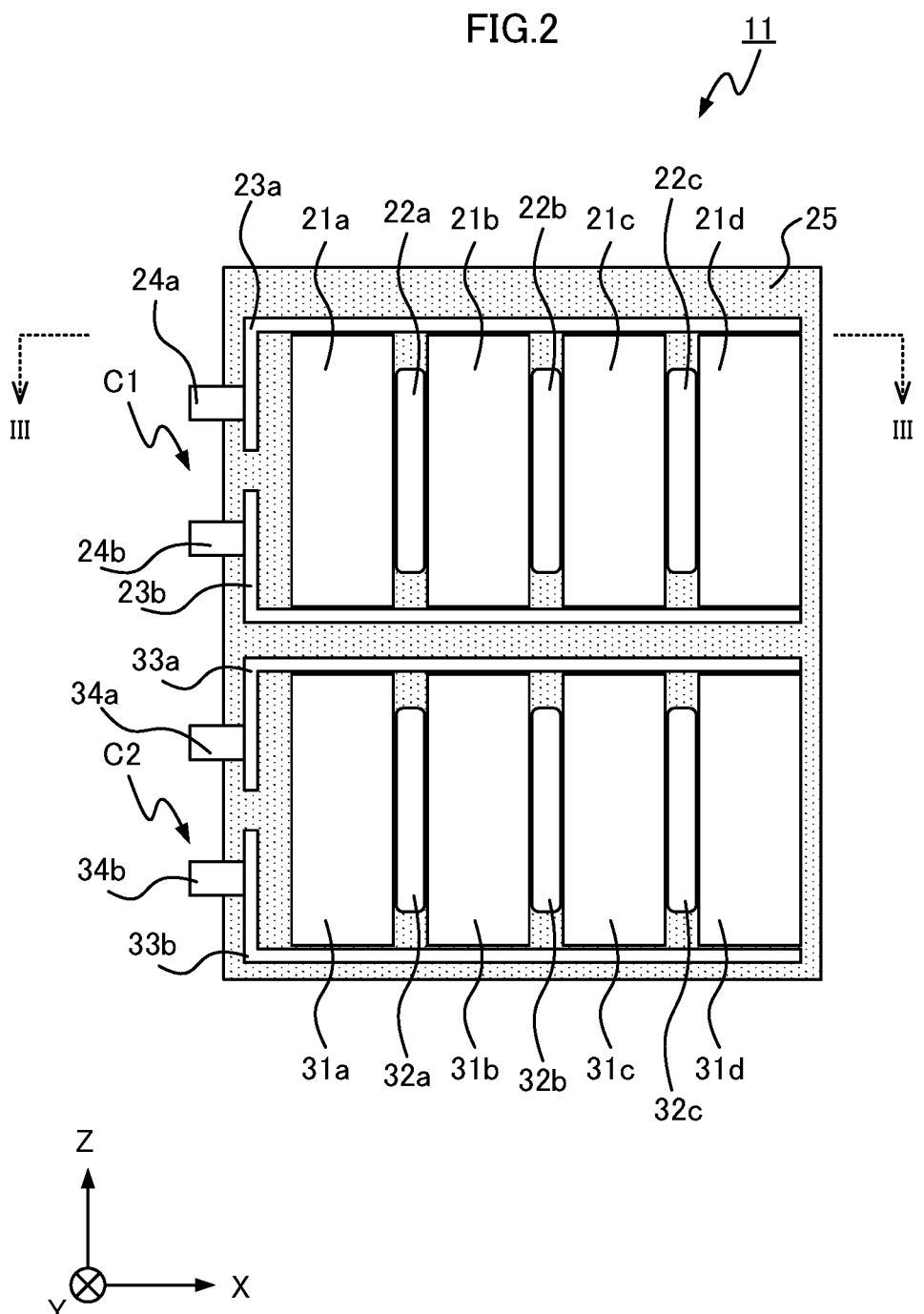
FIG. 2 is a front view of a capacitor unit according to the embodiment.
Figure 3:
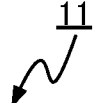
FIG. 3 is a cross-sectional view of the capacitor unit according to the embodiment taken along line III-III as viewed in the direction indicated by the arrows in FIG. 2.
Figure 3:
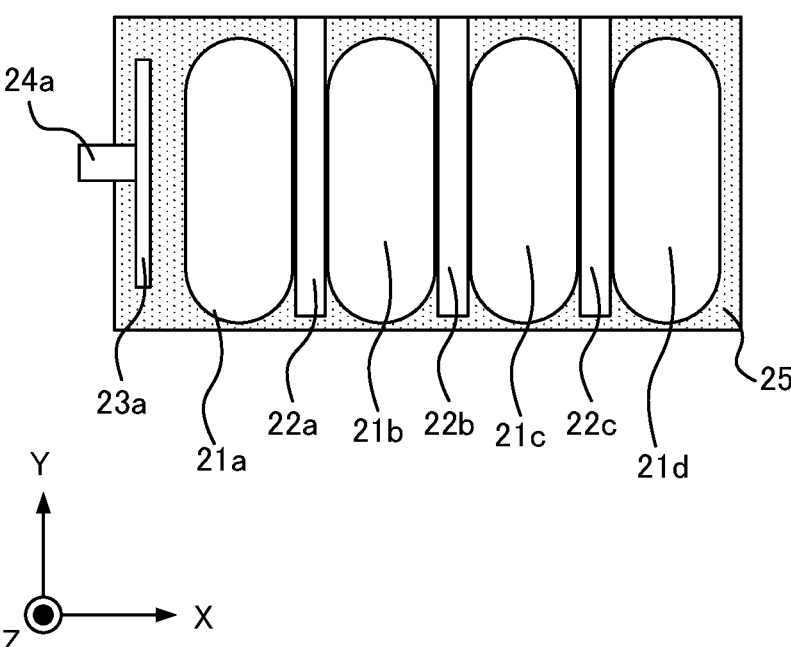

The capacitor unit 11 with a smaller internal temperature increase is described below. As illustrated in FIG. 2 and FIG. 3 that is a cross-sectional view taken along line I-III in FIG. 2, the capacitor unit 11 includes multiple capacitor elements 21a, 21b, 21c, 21d, 31a, 31b, 31c, and 31d, and heat transfer members 22a, 22b, 22c, 32a, 32b, and 32c that internally disperse heat received from the capacitor elements 21a, 21b, 21c, 21d, 31a, 31b, 31c, and 31d. The internal temperature of the capacitor unit 11 refers, more specifically, to the temperature of each of the capacitor elements 21a, 21b, 21c, 21d, 31a, 31b, 31c, and 31d. In FIGS. 2 and 3, Z-axis is a vertical direction, and Y-axis extends parallel to main surfaces of the capacitor elements 21a, 21b, 21c, 21d, 31a, 31b, 31c, and 31d. X-axis is orthogonal to Y- and Z-axes.

The capacitor unit 11 further includes a first busbar 23a electrically connected to the positive electrodes of the capacitor elements 21a, 21b, 21c, and 21d, and a first busbar 33a electrically connected to the positive electrodes of the capacitor elements 31a, 31b, 31c, and 31d. The first busbars 23a and 33a are plates of a conducting material, such as copper or aluminum.

The capacitor unit 11 further includes a second busbar 23b electrically connected to the negative electrodes of the capacitor elements 21a, 21b, 21c, and 21d, and a second busbar 33b electrically connected to the negative electrodes of the capacitor elements 31a, 31b, 31c, and 31d. The second busbars 23b and 33b are plates of a conducting material, such as copper or aluminum. The capacitor unit 11 further includes a first terminal 24a electrically connected to the first busbar 23a, a first terminal 34a electrically connected to the first busbar 33a, a second terminal 24b electrically connected to the second busbar 23b, and a second terminal 34b electrically connected to the second busbar 33b.

The capacitor unit 11 further includes an insulating member 25 that at least partially covers the capacitor elements 21a, 21b, 21c, 21d, 31a, 31b, 31c, and 31d, and the heat transfer members 22a, 22b, 22c, 32a, 32b, and 32c.

The components of the capacitor unit 11 are described in detail below. As illustrated in FIG. 2, the capacitor elements

21a, 21b, 21c, and 21d are arranged in a row with the main surfaces facing one another. More specifically, the capacitor elements 21a, 21b, 21c, and 21d are arranged in X-direction with the main surfaces facing orthogonally to X-axis. Similarly, the capacitor elements 31a, 31b, 31c, and 31d are arranged in a row with the main surfaces facing one another. More specifically, the capacitor elements 31a, 31b, 31c, and 31d are arranged in X-direction with the main surfaces facing in the direction orthogonal to the X-axis.

The capacitor elements 21a, 21b, 21c, 21d, 31a, 31b, 31c, and 31d have the same structure. The structure of the capacitor element 21a is thus described with reference to FIG. 4.

The capacitor element 21a is a film capacitor including a film 41c on which a positive electrode 41a is located and a film 41d on which a negative electrode 41b is located. The films 41c and 41d overlap with each other and are wound around the central axis to form the capacitor element 21a. The film 41c is a plastic film on which a metal, such as aluminum or zinc, is vapor-deposited to form the positive electrode 41a. Similarly, the film 41d is a plastic film on which a metal, such as aluminum or zinc, is vapor-deposited to form the negative electrode 41b.

Figure 4:
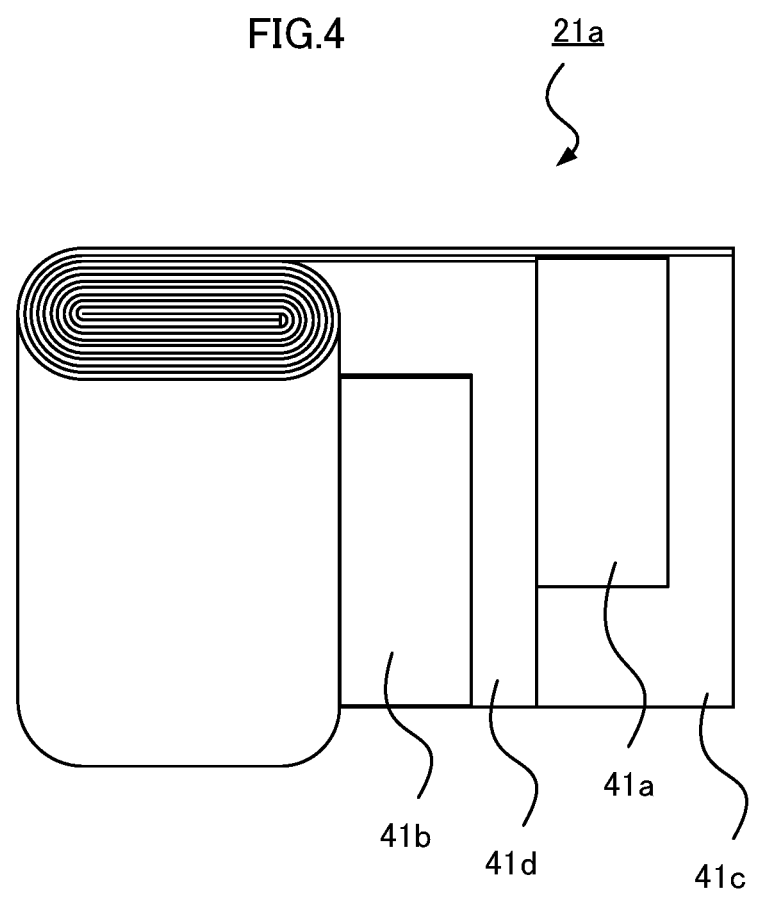

The capacitor element 21a has one end as a positive terminal and the other end as a negative terminal in the direction along the central axis of the capacitor element 21a. In the example of FIG. 4, the capacitor element 21a has the upper end as the positive terminal and the lower end as the negative terminal. In the examples of FIGS. 2 and 3, the capacitor element 21a has the upper end in Z-direction as the positive terminal of the capacitor element 21a and the lower end in Z-direction as the negative terminal of the capacitor element 21a.

The heat transfer members 22a, 22b, 22c, 32a, 32b, and 32c are each located adjacent to at least one of the capacitor elements 21a, 21b, 21c, 21d, 31a, 31b, 31c, and 31d to internally disperse heat transferred from at least one of the capacitor elements 21a, 21b, 21c, 21d, 31a, 31b, 31c, and 31d.

The heat transfer members 22a, 22b, 22c, 32a, 32b, and 32c are each preferably located between two of the capacitor elements 21a, 21b, 21c, 21d, 31a, 31b, 31c, and 31d that are adjacent to each other. Also, the heat transfer members 22a, 22b, 22c, 32a, 32b, and 32c are each preferably located adjacent to a different one of the capacitor elements 21a, 21b, 21c, 21d, 31a, 31b, 31c, and 31d.

In the embodiment, the heat transfer members 22a, 22b, 22c, 32a, 32b, and 32c are located between two of the capacitor elements 21a, 21b, 21c, 21d, 31a, 31b, 31c, and 31d that are adjacent to each other at different positions. More specifically, the heat transfer member 22a is located between the capacitor elements 21a and 21b to internally disperse heat received from the capacitor elements 21a and 21b. The heat transfer member 22b is located between the capacitor elements 21b and 21c to internally disperse heat received from the capacitor elements 21b and 21c. The heat transfer member 22c is located between the capacitor elements 21c and 21d to internally disperse heat received from the capacitor elements 21c and 21d.

Similarly, the heat transfer member 32a is located between the capacitor elements 31a and 31b to internally disperse heat received from the capacitor elements 31a and 31b. The heat transfer member 32b is located between the capacitor elements 31b and 31c to internally disperse heat received from the capacitor elements 31b and 31c. The heat transfer member 32c is located between the capacitor elements 31c and 31d to internally disperse heat received from the capacitor elements 31c and 31d.

The heat transfer members 22a, 22b, 22c, 32a, 32b, and 32c are each preferably a plate with at least one main surface in contact with at least one of the capacitor elements 21a, 21b, 21c, 21d, 31a, 31b, 31c, and 31d. Being in contact herein includes direct contact and indirect contact. In the embodiment, the heat transfer member 22a is a plate with one main surface in contact with the capacitor element 21a and the other main surface in contact with the capacitor element 21b. The heat transfer member 22b is a plate with one main surface in contact with the capacitor element 21b and the other main surface in contact with the capacitor element 21c. The heat transfer member 22c is a plate with one main surface in contact with the capacitor element 21c and the other main surface in contact with the capacitor element 21d.

Similarly, the heat transfer member 32a is a plate with one main surface in contact with the capacitor element 31a and the other main surface in contact with the capacitor element 31b. The heat transfer member 32b is a plate with one main surface in contact with the capacitor element 31b, and the other main surface in contact with the capacitor element 31c. The heat transfer member 32c is a plate with one main surface in contact with the capacitor element 31c and the other main surface in contact with the capacitor element 31d.

The heat transfer member 22a being a plate in contact with the capacitor elements 21a and 21b allows heat to be transferred from the capacitor elements 21a and 21b to the heat transfer member 22a more efficiently and the capacitor elements 21a and 21b to be cooled more efficiently. The same applies to the heat transfer members 22b, 22c, 32a, 32b, and 32c. The capacitor unit 11 thus has a smaller internal temperature increase.

The heat transfer members 22a, 22b, 22c, 32a, 32b, and 32c may be formed from a highly thermally conductive material, or for example, a metal such as copper or aluminum.

As described above, the heat transfer members 22a, 22b, 22c, 32a, 32b, and 32c allow heat generated in the capacitor elements 21a, 21b, 21c, 21d, 31a, 31b, 31c, and 31d to be transferred to the heat transfer members 22a, 22b, 22c, 32a, 32b, and 32c and dispersed inside the heat transfer members 22a, 22b, 22c, 32a, 32b, and 32c. The heat transfer members 22a, 22b, 22c, 32a, 32b, and 32c further increase the efficiency of heat transfer from the capacitor elements 21a, 21b, 21c, 21d, 31a, 31b, 31c, and 31d to the outer surface of the capacitor unit 11, thus reducing the temperature difference between the outer surface of the capacitor unit 11 and the capacitor elements 21a, 21b, 21c, 21d, 31a, 31b, 31c, and 31d. The capacitor elements 21a, 21b, 21c, 21d, 31a, 31b, 31c, and 31d thus have a smaller internal temperature increase, whereas the outer surface of the capacitor unit 11 has a temperature increase.

The heat dispersed inside the heat transfer members 22a, 22b, 22c, 32a, 32b, and 32c as described above also causes the capacitor elements 21a, 21b, 21c, 21d, 31a, 31b, 31c, and 31d to have less temperature variations. In other words, the maximum temperature of the capacitor elements 21a, 21b, 21c, 21d, 31a, 31b, 31c, and 31d is lower.

The first busbar 23a in contact with the vertically upper ends of the capacitor elements 21a, 21b, 21c, and 21d is electrically connected to the positive electrodes 41a of the capacitor elements 21a, 21b, 21c, and 21d. Similarly, the first busbar 33a in contact with the vertically upper ends of the capacitor elements 31a, 31b, 31c, and 31d is electrically connected to the positive electrodes 41a of the capacitor elements 31a, 31b, 31c, and 31d.

The second busbar 23b in contact with the vertically lower ends of the capacitor elements 21a, 21b, 21c, and 21d is electrically connected to the negative electrodes 41b of the capacitor elements 21a, 21b, 21c, and 21d. Similarly, the second busbar 33b in contact with the vertically lower ends of the capacitor elements 31a, 31b, 31c, and 31d is electrically connected to the negative electrodes 41b of the capacitor elements 31a, 31b, 31c, and 31d.

The first terminal 24a is attached to the first busbar 23a with an unillustrated fastener while being in contact with the first busbar 23a. This electrically connects the first terminal 24a to the first busbar 23a. The first terminal 34a is attached to the first busbar 33a with an unillustrated fastener while being in contact with the first busbar 33a. This electrically connects the first terminal 34a to the first busbar 33a.

Similarly, the second terminal 24b is attached to the second busbar 23b with an unillustrated fastener while being in contact with the second busbar 23b. This electrically connects the second terminal 24b to the second busbar 23b. The second terminal 34b is attached to the second busbar 33b with an unillustrated fastener while being in contact with the second busbar 33b. This electrically connects the second terminal 34b to the second busbar 33b.

The capacitor elements 21a, 21b, 21c, and 21d, the first busbar 23a, the second busbar 23b, the first terminal 24a, and the second terminal 24b described above are included in the first capacitor C1. The first terminal 24a serves as a positive terminal of the first capacitor C1. The second terminal 24b serves as a negative terminal of the first capacitor C1. The first terminal 24a is electrically connected to the positive terminal 1a and the power converter 12 with an unillustrated busbar. The second terminal 24b is electrically connected to the power converter 12 and the second capacitor C2 with an unillustrated busbar.

The capacitor elements 31a, 31b, 31c, and 31d, the first busbar 33a, the second busbar 33b, the first terminal 34a, and the second terminal 34b described above are included in the second capacitor C2. The first terminal 34a serves as a positive terminal of the second capacitor C2. The second terminal 34b serves as a negative terminal of the second capacitor C2. The first terminal 34a is electrically connected to the power converter 12 and the first capacitor C1 with an unillustrated busbar. The second terminal 34b is electrically connected to the negative terminal 1b and the power converter 12 with an unillustrated busbar.

The insulating member 25 is formed from a resin, such as epoxy, urethane, or silicone. The insulating member 25 insulates the capacitor elements 21a, 21b, 21c, 21d, 31a, 31b, 31c, and 31d, and the heat transfer members 22a, 22b, 22c, 32a, 32b, and 32c from one another. In the embodiment, the insulating member 25 at least partially covers the capacitor elements 21a, 21b, 21c, 21d, 31a, 31b, 31c, and 31d, and the heat transfer members 22a, 22b, 22c, 32a, 32b, and 32c. In other words, the capacitor elements 21a, 21b, 21c, 21d, 31a, 31b, 31c, and 31d, and the heat transfer members 22a, 22b, 22c, 32a, 32b, and 32c are at least partially encapsulated by the insulating member 25. This fixes the positions of the heat transfer members 22a, 22b, 22c, 32a, 32b, and 32c relative to the capacitor elements 21a, 21b, 21c, 21d, 31a, 31b, 31c, and 31d.

In the embodiment, the insulating member 25 covers the first busbars 23a and 33a and the second busbars 23b and 33b, and covers the first terminals 24a and 34a and the second terminals 24b and 34b, with the first terminals 24a and 34a and the second terminals 24b and 34b being partially exposed. This fixes the positions of the capacitor elements 21a, 21b, 21c, 21d, 31a, 31b, 31c, and 31d, the heat transfer members 22a, 22b, 22c, 32a, 32b, and 32c, the first busbars 23a and 33a, the second busbars 23b and 33b, the first terminals 24a and 34a, and the second terminals 24b and 34b relative to one another. With the first terminals 24a and 34a and the second terminals 24b and 34b being partially exposed, the busbars can be electrically connected to the first terminals 24a and 34a and the second terminals 24b and 34b.

To form the insulating member 25 covering the components of the capacitor unit 11 as described above, for example, an unillustrated case accommodating the components of the capacitor unit 11 is filled with an epoxy resin, and the cured resin is removed from the case.

Figure 5:
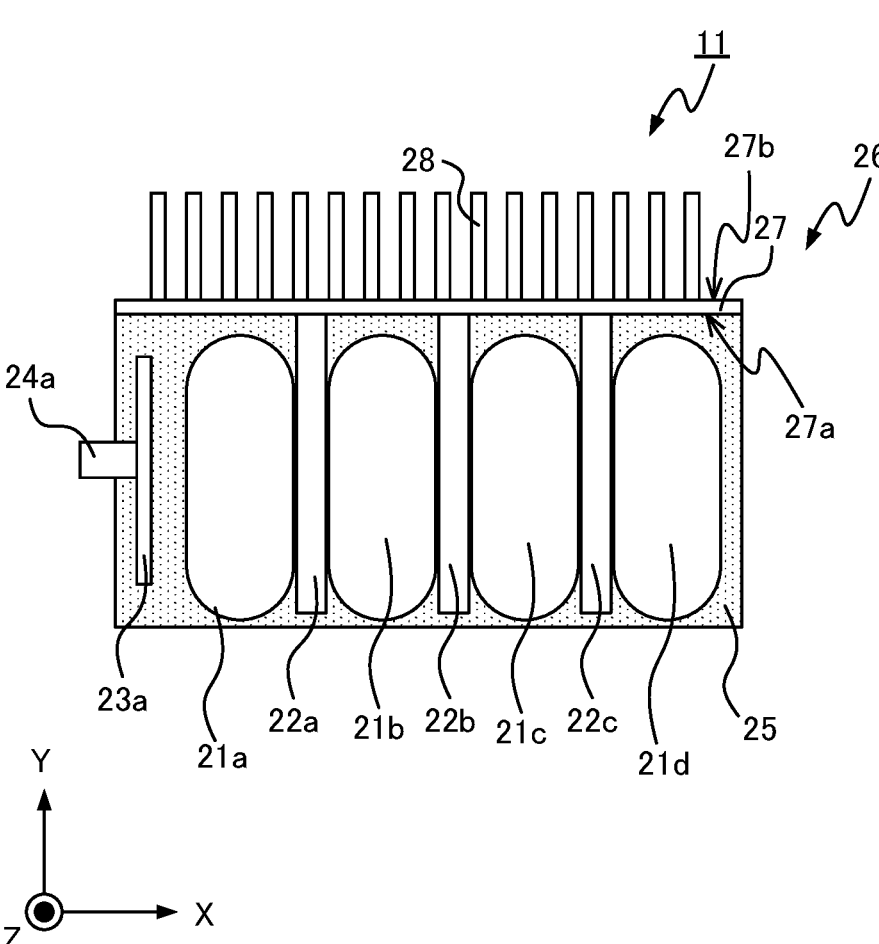
FIG. 5 is a cross-sectional view of the capacitor unit according to the embodiment.

To increase cooling performance, as illustrated in FIG. 5, preferably, the capacitor unit 11 is thermally connected to the heat transfer members 22a, 22b, 22c, 32a, 32b, and 32c, and further includes a cooler 26 that dissipates heat transferred from the capacitor elements 21a, 21b, 21c, 21d, 31a, 31b, 31c, and 31d through the heat transfer members 22a, 22b, 22c, 32a, 32b, and 32c. FIG. 5 is a cross-sectional view of the capacitor unit 11 taken along the same line as in FIG. 3.

The cooler 26 includes a heat-receiving block 27 that is thermally connected to the heat transfer members 22a, 22b, 22c, 32a, 32b, and 32c, and a heat dissipater 28 that dissipates heat transferred from the heat-receiving block 27. The insulating member 25 is attached to one main surface 27a of the heat-receiving block 27. The heat dissipater 28 is attached to the other main surface 27b of the heat-receiving block 27. The heat-receiving block 27 thermally connected to the heat transfer members 22a, 22b, 22c, 32a, 32b, and 32c allows heat to be transferred from the capacitor elements 21a, 21b, 21c, 21d, 31a, 31b, 31c, and 31d to the heat-receiving block 27 through the heat transfer members 22a, 22b, 22c, 32a, 32b, and 32c. The heat-receiving block 27 is preferably formed from a highly thermally conductive material, or for example, a metal such as copper or aluminum.

The heat-receiving block 27 is preferably in contact with the heat transfer members 22a, 22b, 22c, 32a, 32b, and 32c. In the embodiment, the insulating member 25 covers the heat transfer members 22a, 22b, 22c, 32a, 32b, and 32c, with the end faces of the heat transfer members 22a, 22b, 22c, 32a, 32b, and 32c closer to the cooler 26 being exposed. The insulating member 25 is attached to the cooler 26 with the end faces of the heat transfer members 22a, 22b, 22c, 32a, 32b, and 32c in direct contact with the cooler 26. The insulating member 25 is attached to the heat-receiving block 27 in the cooler 26 with, for example, an unillustrated fastener.

The heat-receiving block 27 in contact with the end faces of the heat transfer members 22a, 22b, 22c, 32a, 32b, and 32c allows heat to be transferred from the heat transfer members 22a, 22b, 22c, 32a, 32b, and 32c directly to the heat-receiving block 27, thus increasing heat transfer efficiency. This allows the capacitor elements 21a, 21b, 21c, 21d, 31a, 31b, 31c, and 31d to be cooled more efficiently. The capacitor elements 21a, 21b, 21c, 21d, 31a, 31b, 31c, and 31d can thus have a smaller temperature increase.

The heat dissipater 28 dissipates heat transferred from the heat-receiving block 27 to ambient air. Heat transferred from the capacitor elements 21a, 21b, 21c, 21d, 31a, 31b, 31c, and 31d to the heat-receiving block 27 through the heat transfer members 22a, 22b, 22c, 32a, 32b, and 32c is dissipated to ambient air by the heat dissipater 28 to cool the capacitor elements 21a, 21b, 21c, 21d, 31a, 31b, 31c, and

Figure 6:
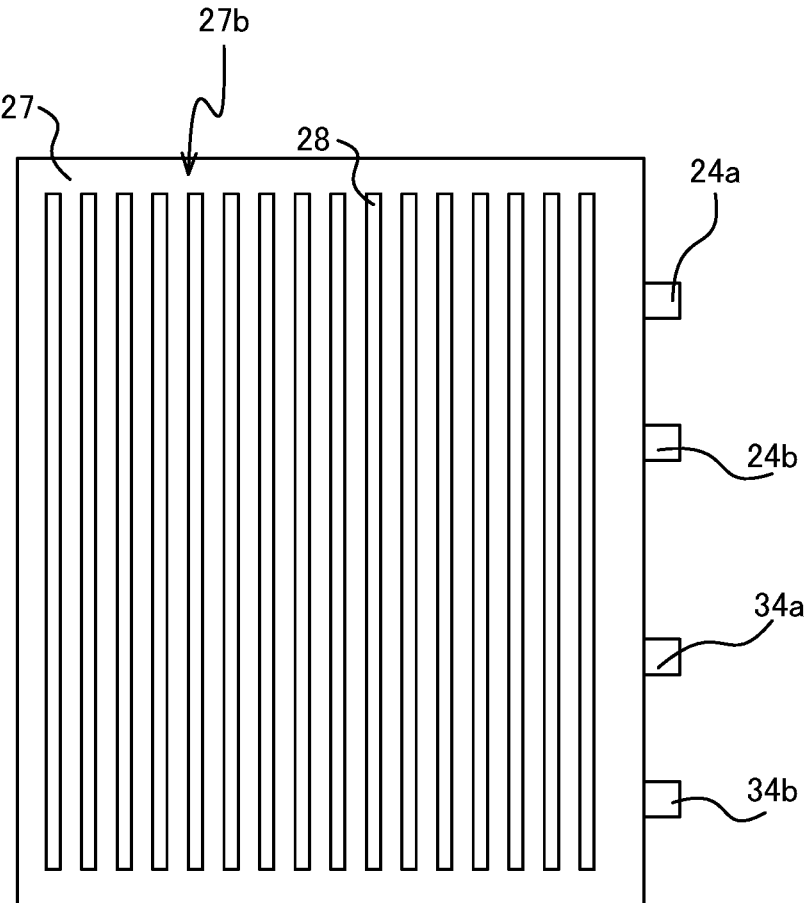
FIG. 6 is a rear view of the capacitor unit according to the embodiment.
Figure 6:
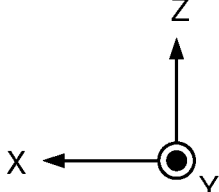

31d. In the embodiment, as illustrated in FIG. 6, the heat dissipater 28 includes multiple fins having main surfaces parallel to a YZ plane. More specifically, the heat dissipater 28 is preferably formed from a highly thermally conductive material, or for example, a metal such as copper or aluminum.

Figure 7:
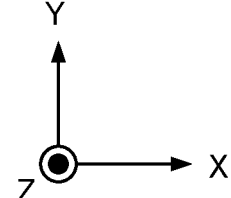
FIG. 7 is a cross-sectional view of the electronic device according to the embodiment.

As illustrated in FIG. 7, the electronic device 1 accommodates the capacitor unit 11 with the above structure and the power converter 12 inside a housing. More specifically, the electronic device 1 includes a housing 13 that accommodates the capacitor unit 11 and the power converter 12, and a power converter cooler 14 that cools the power converter 12. For ease of illustration, FIG. 7 illustrates, of the components of the power converter 12, multiple switching elements SW alone, and does not illustrate the other components of the power converter 12, such as the positive terminal 1a, the negative terminal 1b, busbars connected to the positive terminal 1a and the negative terminal 1b, and terminals and busbars connected to the load 51.

The components of the electronic device 1 are described in detail below. The housing 13 has openings 13a and 13b. In the embodiment, the openings 13a and 13b are on different surfaces.

The capacitor unit 11 is accommodated in the housing 13. The cooler 26 in the capacitor unit 11 closes the opening 13a, with a portion of the cooler 26 being exposed outside the housing 13 through the opening 13a. With the opening 13a closed with a portion of the cooler 26, air outside the housing 13 containing dust, moisture, and other foreign matter is less likely to flow into the housing 13 through the opening 13a. More specifically, the heat-receiving block 27 closes the opening 13a from inside the housing 13, with the heat dissipater 28 being exposed outside the housing 13. The heat dissipater 28 being exposed outside the housing 13 thus dissipates heat transferred from the heat-receiving block 27 to air outside the housing 13. The capacitor elements 21a, 21b, 21c, 21d, 31a, 31b, 31c, and 31d are thus cooled. The temperature of air outside the housing 13 is lower than the temperature of the air inside the housing 13. The capacitor unit 11 thus has higher cooling performance than a capacitor unit that dissipates heat to air inside a housing.

The power converter cooler 14 includes a heat-receiving block 15 on which the multiple switching elements SW are mounted and a heat dissipater 16 that dissipates heat transferred from the switching elements SW through the heat-receiving block 15. The switching elements SW are mounted on one main surface 15a of the heat-receiving block 15, or more specifically, the surface facing the inside of the housing 13. The power converter 12 includes, for example, six switching elements SW that are arranged two-dimensionally on the main surface 15a of the heat-receiving block 15. The heat dissipater 16 is mounted on the other main surface 15b of the heat-receiving block 15, or more specifically, the surface facing the outside of the housing 13. The heat-receiving block 15 is preferably formed from a highly thermally conductive material, or for example, a metal such as copper or aluminum.

The power converter cooler 14 with the above structure is accommodated in the housing 13 to close the opening 13b, with a portion of the power converter cooler 14 being exposed outside the housing 13 through the opening 13b. With the opening 13b closed with a portion of the power converter cooler 14, air outside the housing 13 containing dust, moisture, and other foreign matter is less likely to flow into the housing 13 through the opening 13b. More specifically, the heat-receiving block 15 closes the opening 13b from inside the housing 13, with the heat dissipater 16 being exposed outside the housing 13. The heat dissipater 16 being exposed outside the housing 13 thus dissipates heat transferred from the switching elements SW through the heat-receiving block 15 to air outside the housing 13. The switching elements SW are thus cooled.

The heat dissipater 16 includes multiple fins having main surfaces parallel to an XY plane. The electronic device 1 mounted on a railway vehicle with Y-axis aligned with the traveling direction of the railway vehicle causes air to flow between the fins on the heat dissipater 16 as the vehicle travels. The switching elements SW are thus cooled more efficiently.

A laminate busbar 17 electrically connects the capacitor unit 11 and the power converter 12. More specifically, the laminate busbar 17 includes a stack of an insulating layer and a conductive layer to electrically connect the first terminals 24a and 34a and the second terminals 24b and 34b to the corresponding switching elements SW. The laminate busbar 17 is attached to the first terminals 24a and 34a, the second terminals 24b and 34b, and the switching elements SW with unillustrated fasteners.

When electric power is supplied to the electronic device 1 with the above structure, or more specifically, when the electronic device 1 is electrically connected to the current collector, a current flows into the capacitor elements 21a, 21b, 21c, 21d, 31a, 31b, 31c, and 31d, thus generating heat in the capacitor elements 21a, 21b, 21c, 21d, 31a, 31b, 31c, and 31d. The heat generated in the capacitor elements 21a, 21b, 21c, 21d, 31a, 31b, 31c, and 31d is transferred to the heat-receiving block 27 in the cooler 26 through the heat transfer members 22a, 22b, 22c, 32a, 32b, and 32c. The heat transferred to the heat-receiving block 27 is dissipated to air outside the housing 13 either through the heat dissipater 28 attached to the heat-receiving block 27 or through the housing 13 in contact with the heat-receiving block 27. This cools the capacitor elements 21a, 21b, 21c, 21d, 31a, 31b, 31c, and 31d, and the capacitor elements 21a, 21b, 21c, 21d, 31a, 31b, 31c, and 31d have a smaller temperature increase.

During the operation of the power converter 12, the switching elements SW generate heat when being switched between on and off. The heat generated in the switching elements SW is transferred to the heat-receiving block 15. The heat transferred to the heat-receiving block 15 is dissipated from the heat dissipater 16 to air outside the housing 13. The switching elements SW are thus cooled.

As described above, heat generated in the capacitor elements 21a, 21b, 21c, 21d, 31a, 31b, 31c, and 31d and in any one of the switching elements SW is dissipated to air outside the housing 13. The air inside the housing 13 thus has a smaller temperature increase. The capacitor unit 11 thus has a smaller internal temperature increase, and the switching elements SW also have a smaller temperature increase.

In the capacitor unit 11 according to the embodiment, as described above, heat generated in the capacitor elements 21a, 21b, 21c, 21d, 31a, 31b, 31c, and 31d is transferred to the heat transfer members 22a, 22b, 22c, 32a, 32b, and 32c, and dispersed inside the heat transfer members 22a, 22b, 22c, 32a, 32b, and 32c. This reduces the temperature difference between the outer surface of the capacitor unit 11 and the capacitor elements 21a, 21b, 21c, 21d, 31a, 31b, 31c, and 31d. The capacitor elements 21a, 21b, 21c, 21d, 31a, 31b, 31c, and 31d thus have a smaller temperature increase.

The heat dispersed inside the heat transfer members 22a, 22b, 22c, 32a, 32b, and 32c as described above also causes the capacitor elements 21a, 21b, 21c, 21d, 31a, 31b, 31c, and 31d to have less temperature variations. In other words, the maximum temperature of the capacitor elements 21a, 21b, 21c, 21d, 31a, 31b, 31c, and 31d is lower.

For the capacitor unit 11 including the cooler 26, heat generated in the capacitor elements 21a, 21b, 21c, 21d, 31a, 31b, 31c, and 31d is transferred to the cooler 26 through the heat transfer members 22a, 22b, 22c, 32a, 32b, and 32c and dissipated from the cooler 26. This cools the capacitor elements 21a, 21b, 21c, 21d, 31a, 31b, 31c, and 31d more efficiently, and the capacitor elements 21a, 21b, 21c, 21d, 31a, 31b, 31c, and 31d have a still smaller temperature increase.

The degree of degradation of the films 41c and 41d depends on the temperature of the capacitor elements 21a, 21b, 21c, 21d, 31a, 31b, 31c, and 31d and the potential gradient in the capacitor elements 21a, 21b, 21c, 21d, 31a, 31b, 31c, and 31d. More specifically, as the temperature or potential gradient increases in the capacitor elements 21a, 21b, 21c, 21d, 31a, 31b, 31c, and 31d, the films 41c and 41d have a shorter service life.

As described above, the capacitor elements 21a, 21b, 21c, 21d, 31a, 31b, 31c, and 31d having a smaller temperature increase can have a longer service life. The capacitor elements with substantially the same service life can have a higher potential gradient. In other words, with substantially the same service life, a larger voltage can be applied to the capacitor elements 21a, 21b, 21c, 21d, 31a, 31b, 31c, and 31d, or the films 41c and 41d can be thinner. In other words, the capacitor unit 11 can have increased design freedom.

A larger voltage may be applied to the capacitor elements 21a, 21b, 21c, 21d, 31a, 31b, 31c, and 31d to increase the capacitance of the capacitor unit 11. The films 41c and 41d that are thinner can reduce the size of the capacitor elements 21a, 21b, 21c, 21d, 31a, 31b, 31c, and 31d, or in other words, the size of the capacitor unit 11.

Embodiments of the present disclosure are not limited to the embodiments described above.

The number of capacitor elements in the capacitor unit 11 is not limited to the number of capacitor elements 21a, 21b, 21c, 21d, 31a, 31b, 31c, and 31d in the above example, but may be any number. In the embodiment, the capacitor unit 11 includes two capacitor groups, or the first capacitor C1 and the second capacitor C2, but may include any number of capacitor groups. For example, the capacitor unit may include the first capacitor C1 alone, or may include a third capacitor in addition to the first capacitor C1 and the second capacitor C2.

The structure of the capacitor elements 21a, 21b, 21c, 21d, 31a, 31b, 31c, and 31d is not limited to the structure in the above example. In one example, the capacitor elements 21a, 21b, 21c, 21d, 31a, 31b, 31c, and 31d may be film capacitors of metal foil.

Figure 8:
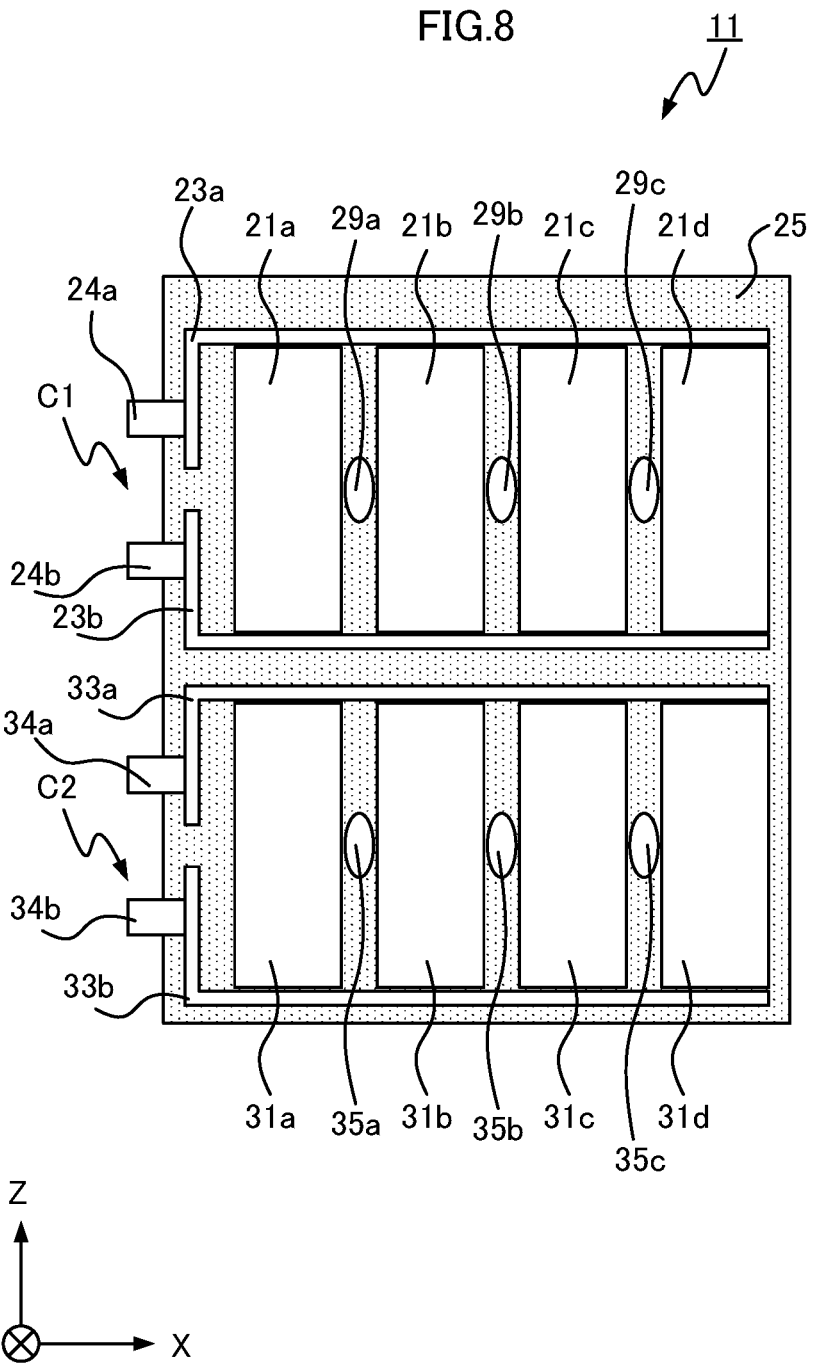
FIG. 8 is a front view of a capacitor unit according to a first modification of the embodiment.

The heat transfer members 22a, 22b, 22c, 32a, 32b, and 32c may be in any number and in any shape that allow heat generated in the capacitor elements 21a, 21b, 21c, 21d, 31a, 31b, 31c, and 31d to be dispersed internally. In one example, the capacitor unit 11 may include a single flat plate heat transfer member. In another example, the capacitor unit 11 may include rod-shaped heat transfer members 29a, 29b, 29c, 35a, 35b, and 35c, as illustrated in FIG. 8. The heat transfer members 29a, 29b, 29c, 35a, 35b, and 35c are each located adjacent to at least one of the capacitor elements 21a, 21b, 21c, 21d, 31a, 31b, 31c, and 31d to internally disperse heat transferred from at least one of the capacitor elements 21a, 21b, 21c, 21d, 31a, 31b, 31c, and 31d. For the capacitor unit 11 including the cooler 26, the heat transfer members 29a, 29b, 29c, 35a, 35b, and 35c transfer heat transferred from at least one of the capacitor elements 21a, 21b, 21c, 21d, 31a, 31b, 31c, and 31d to the cooler 26.

The heat transfer members 29a, 29b, 29c, 35a, 35b, and 35c are each preferably located between two of the capacitor elements 21a, 21b, 21c, 21d, 31a, 31b, 31c, and 31d that are adjacent to each other. Also, the heat transfer members 29a, 29b, 29c, 35a, 35b, and 35c are each preferably located adjacent to a different one of the capacitor elements 21a, 21b, 21c, 21d, 31a, 31b, 31c, and 31d.

As illustrated in FIG. 8, the heat transfer members 29a, 29b, 29c, 35a, 35b, and 35c are each preferably located between two of the capacitor elements 21a, 21b, 21c, 21d, 31a, 31b, 31c, and 31d that are adjacent to each other at different positions.

In another example, the heat transfer members 22a, 22b, 22c, 32a, 32b, and 32c may be U-bent plates or U-bent rods. In another example, the heat transfer members 22a, 22b, 22c, 32a, 32b, and 32c may be plates including an internal channel containing refrigerant. The same applies to the heat transfer members 29a, 29b, 29c, 35a, 35b, and 35c.

The heat transfer members 22a, 22b, 22c, 32a, 32b, 32c, 29a, 29b, 29c, 35a, 35b, and 35c may be located differently from the above example. In one example, in addition to the positions described above, a heat transfer member may be located adjacent to the capacitor element 21d alone, or specifically, adjacent to the surface of the capacitor element 21d facing in the positive X-direction. In another example, a heat transfer member may be located between the first busbar 23a and the surface of the capacitor element 21a facing in the negative X-direction.

The heat transfer members 22a, 22b, 22c, 32a, 32b, 32c, 29a, 29b, 29c, 35a, 35b, and 35c may be entirely covered with the insulating member 25.

The heat transfer members 22a, 22b, 22c, 32a, 32b, 32c, 29a, 29b, 29c, 35a, 35b, and 35c may be in indirect contact with the cooler 26. In one example, a member that reduces contact thermal resistance, such as a heat dissipating sheet, grease, or other thermal interface material (TIM), may be located between the heat-receiving block 27 in the cooler 26 and the heat transfer members 22a, 22b, 22c, 32a, 32b, 32c, 29a, 29b, 29c, 35a, 35b, and 35c.

The material of the heat transfer members 22a, 22b, 22c, 32a, 32b, 32c, 29a, 29b, 29c, 35a, 35b, and 35c is not limited to metals but may be any material that can internally disperse heat. In one example, each of the heat transfer members 22a, 22b, 22c, 32a, 32b, 32c, 29a, 29b, 29c, 35a, 35b, and 35c may be an anisotropic heat transferring member formed from, for example, graphite. In another example, each of the heat transfer members 22a, 22b, 22c, 32a, 32b, 32c, 29a, 29b, 29c, 35a, 35b, and 35c may be a member formed from multiple materials, such as a cladding material formed from different metals.

The method for fixing the positions of the heat transfer members 22a, 22b, 22c, 32a, 32b, and 32c relative to the capacitor elements 21a, 21b, 21c, 21d, 31a, 31b, 31c, and 31d is not limited to encapsulation with the insulating member 25, but may be any method. When the electronic device 1 is to be mounted on a railway vehicle, the heat transfer members 22a, 22b, 22c, 32a, 32b, and 32c is preferably fixed with a method that provides firm fixing to maintain the positions relative to the capacitor elements 21a, 21b, 21c, 21d, 31a, 31b, 31c, and 31d under vibrations from a traveling railway vehicle.

Figure 9:
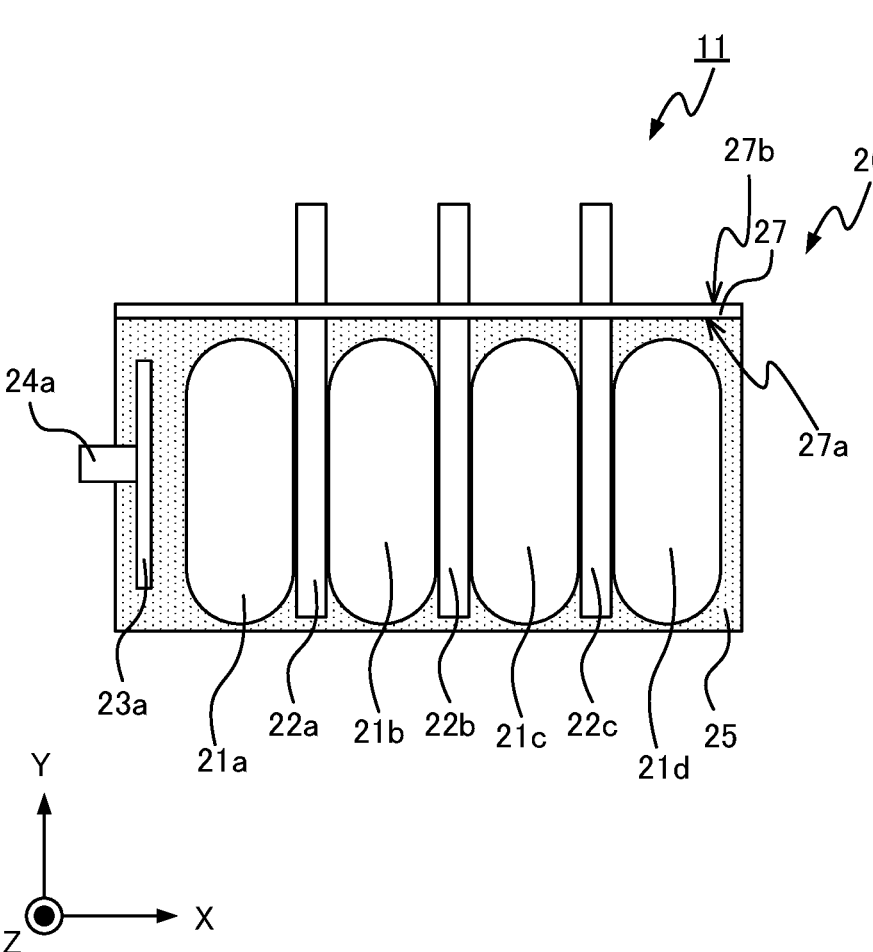
FIG. 9 is a top view of a capacitor unit according to a second modification of the embodiment.

The cooler 26 may have any shape that can dissipate transferred heat. As illustrated in FIG. 9, for example, portions of the heat transfer members 22a, 22b, and 22c may extend through the heat-receiving block 27 to serve as heat dissipaters. Similarly, portions of the heat transfer members 32a, 32b, and 32c may extend through the heat-receiving block 27 to serve as heat dissipaters. The cooler 26 illustrated in FIG. 9 may further include a heat dissipater 28 similar to the heat dissipater in FIG. 5.

The heat dissipater 28 may have any shape that can dissipate heat transferred from the heat-receiving block 27. In one example, the fins on the heat dissipater 28 may be modified into any shape as appropriate for air flow around the heat dissipater 28. In another example, the heat dissipater 28 may include multiple rod-shaped protrusions. In another example, the heat dissipater 28 may include a heat pipe or a plate including an internal channel containing refrigerant.

Figure 10:
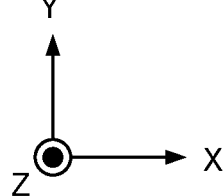
FIG. 10 is a cross-sectional view of an electronic device according to a modification of the embodiment.

The cooler 26 may be located differently from the above example. More specifically, the cooler 26 may be located inside the housing 13 rather than being outside the housing 13. In this case, as illustrated in FIG. 10, the cooler 26 is preferably at a position inside the housing 13 into which air flows from outside the housing 13. An electronic device 1 in FIG. 10 is described below focusing on the differences in the structures from the electronic device 1 in FIG. 7.

The electronic device 1 includes a partition 18 that divides an internal space of the housing 13 into a first space 19a allowing less air flowing in from outside the housing 13 and a second space 19b allowing air flowing in from outside the housing 13. The housing 13 has multiple openings 13c in the surface facing the second space 19b, and air from outside the housing 13 flows into the second space 19b through the openings 13c.

The partition 18 includes an opening 18a. The cooler 26 closes the opening 18a with a portion located in the second space 19b. With the opening 18a closed with a portion of the cooler 26, air outside the housing 13 containing dust, moisture, and other foreign matter is less likely to flow into the first space 19a through the opening 18a. More specifically, the heat-receiving block 27 closes the opening 18a from inside the first space 19a, with the heat dissipater 28 being exposed to the second space 19b. The heat dissipater 28 being exposed to the second space 19b dissipates heat transferred from the heat-receiving block 27 to air flowing into the second space 19b from outside the housing 13. The capacitor elements 21a, 21b, 21c, 21d, 31a, 31b, 31c, and 31d are thus cooled.

In another example, the openings 13a and 13b illustrated in FIG. 7 may be located on the same surface of the housing 13, and the switching elements SW may be thermally connected to the cooler 26. In other words, the capacitor unit 11 and the switching elements SW may be cooled with a common cooling device. In this case, the main surfaces 27a and 27b of the heat-receiving block 27 may be sized to accommodate the switching elements SW, in addition to the insulating member 25.

The insulating member 25 may be fixed to the heat-receiving block 27 with any method. In one example, the insulating member 25 may be bonded to the heat-receiving block 27 with an adhesive.

The electronic device 1 illustrated in FIG. 7 may include the capacitor unit 11 illustrated in FIG. 3. In this case, the insulating member 25 may be attached to the inner surface of the housing 13 with the opening 13a illustrated in FIG. 7 closed with the insulating member 25. Similarly, the electronic device 1 illustrated in FIG. 10 may include the capacitor unit 11 illustrated in FIG. 3. In this case, the insulating member 25 may be attached to the partition 18 with the opening 18a illustrated in FIG. 10 closed with the insulating member 25.

The electronic device 1 is not limited to a three-level power conversion apparatus, but may be any device including the capacitor unit 11. In one example, the electronic device 1 may be a rectifier. The electronic device 1 is mountable on, in addition to a railway vehicle, any movable body such as an automobile, a ship, or an aircraft.

The load 51 is not limited to a three-phase induction motor, but may be any device that receives power supplied from the electronic device 1. The load 51 is, for example, an air-conditioner or an illuminator.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

REFERENCE SIGNS LIST

1 Electronic device
1*a* Positive terminal
1*b* Negative terminal
11 Capacitor unit
12 Power converter
13 Housing
13*a*, 13*b*, 13*c*, 18*a* Opening
14 Power converter cooler
15, 27 Heat-receiving block
15*a*, 15*b*, 27*a*, 27*b* Main surface
16, 28 Heat dissipater
17 Laminate busbar
18 Partition
19*a* First space
19*b* Second space
21*a*, 21*b*, 21*c*, 21*d*, 31*a*, 31*b*, 31*c*, 31*d* Capacitor element
22*a*, 22*b*, 22*c*, 29*a*, 29*b*, 29*c*, 32*a*, 32*b*, 32*c*, 35*a*, 35*b*, 35*c* Heat transfer member
23*a*, 33*a* First busbar
23*b*, 33*b* Second busbar
24*a*, 34*a* First terminal
24*b*, 34*b* Second terminal
25 Insulating member
26 Cooler
41*a* Positive electrode
41*b* Negative electrode
41*c*, 41*d* Film
51 Load
C1 First capacitor
C2 Second capacitor
SW Switching element

The invention claimed is:

1. An electronic device, comprising:
a capacitor unit comprising:
a plurality of capacitor elements arranged in a row with main surfaces thereof facing one another;
one or more heat transfer members located adjacent to at least one capacitor element of the plurality of capacitor elements and configured to internally dissipate heat received from the at least one capacitor element of the plurality of capacitor elements;
a first busbar extending in a direction in which the plurality of capacitor elements are arranged, and electrically connected to positive electrodes of the plurality of capacitor elements;
a second busbar extending in the direction in which the plurality of capacitor elements are arranged, and electrically connected to negative electrodes of the plurality of capacitor elements;
a first terminal electrically connected to the positive electrodes of the plurality of capacitive elements;
a second terminal electrically connected to the negative electrodes of the plurality of capacitive elements; and
a heat receiving block thermally connected to the one or more heat transfer members;
a power converter to convert power supplied from a power supply through the capacitor unit to power to be supplied to a load and output the power resulting from conversion;
a housing accommodating the capacitor unit and the power converter; and
a power converter cooler to dissipate heat transferred from the power converter to air outside the housing,
wherein portions of the one or more heat transfer members extend through the heat-receiving block in a direction orthogonal to the direction in which the plurality of capacitor elements are arranged, and dissipate heat transferred from the at least one capacitor element of the plurality of capacitor elements to the air outside the housing,
the heat-receiving block included in the capacitor unit closes a first opening in the housing with portions of the one or more heat transfer members exposed outside the housing through the first opening, and
the power converter cooler closes a second opening on a surface different from the surface on which the first opening is formed with a portion of the power converter cooler being exposed outside the housing through the second opening.

2. An electronic device, comprising:
a capacitor unit comprising:
a plurality of capacitor elements arranged in a row with main surfaces thereof facing one another;
one or more heat transfer members located adjacent to at least one capacitor element of the plurality of capacitor elements and configured to internally dissipate heat received from the at least one capacitor element of the plurality of capacitor elements;
a first busbar extending in a direction in which the plurality of capacitor elements are arranged, and electrically connected to positive electrodes of the plurality of capacitor elements;
a second busbar extending in the direction in which the plurality of capacitor elements are arranged, and electrically connected to negative electrodes of the plurality of capacitor elements:
a first terminal electrically connected to the positive electrodes of the plurality of capacitive elements;
a second terminal electrically connected to the negative electrodes of the plurality of capacitive elements; and
a heat receiving block thermally connected to the one or more heat transfer members;
a power converter to convert power supplied from a power supply through the capacitor unit to power to be supplied to a load and output the power resulting from conversion;
a housing accommodating the capacitor unit and the power converter;

a power converter cooler to dissipate heat transferred from the power converter to air outside the housing; and a partition dividing an internal space of the housing into a first space and a second space, the first space accommodating the capacitor unit and the power converter and suppressing air flowing in from outside the housing, the second space allowing air flowing in from outside the housing, wherein portions of the one or more heat transfer members extend through the heat-receiving block in a direction orthogonal to the direction in which the plurality of capacitor elements are arranged, and dissipate heat transferred from the at least one capacitor element of the plurality of capacitor elements to the air outside the housing, the heat-receiving block included in the capacitor unit closes an opening in the partition, with a portion of a cooler being exposed to the second space through the opening, the cooler being formed with portions of the one or more heat transfer members extending through the heat-receiving block, and the power converter cooler closes an opening in the housing with a portion of the power converter cooler being exposed outside the housing through the opening.

*   *   *   *   *